US012576680B2

(12) United States Patent
Coulthard et al.

(10) Patent No.: US 12,576,680 B2
(45) Date of Patent: Mar. 17, 2026

(54) SYNTHETIC ELASTOMERIC AIR SPRING WITHOUT REINFORCING FIBERS

(71) Applicant: ILJIN USA Corporation, Novi, MI (US)

(72) Inventors: Alan Coulthard, Flat Rock, MI (US); Jeremy Mercer, Farmington Hills, MI (US); Michael L. Crabtree, Arvada, CO (US); Ken Casagrande, Commerce Township, MI (US); Alan Wall, Novi, MI (US); Adrian Thompson, Beverly Hills, MI (US); Ruben Jasso, Woodhaven, MI (US)

(73) Assignee: ILJIN USA Corporation, Novi, MI (US)

( * ) Notice: Subject to any disclaimer, the term of this patent is extended or adjusted under 35 U.S.C. 154(b) by 550 days.

(21) Appl. No.: 17/820,295

(22) Filed: Aug. 17, 2022

(65) Prior Publication Data

US 2023/0056137 A1     Feb. 23, 2023

Related U.S. Application Data

(60) Provisional application No. 63/233,820, filed on Aug. 17, 2021.

(51) Int. Cl.
*B60G 11/27*      (2006.01)
*B60G 15/12*      (2006.01)
*F16F 9/04*      (2006.01)
*F16F 9/08*      (2006.01)

(52) U.S. Cl.
CPC ........ *B60G 11/27* (2013.01); *B60G 2202/152* (2013.01); *B60G 2206/424* (2013.01); *B60G 2206/73* (2013.01); *B60G 2206/8201* (2013.01)

(58) Field of Classification Search
CPC .............. B60G 11/27; B60G 2202/152; B60G 2206/424; B60G 2206/73; B60G 2206/8201; F16F 9/084; F16F 9/0454
See application file for complete search history.

(56) References Cited

U.S. PATENT DOCUMENTS

| | | | | |
|---|---|---|---|---|
| 4,129,025 | A | * 12/1978 | Carey | B21D 51/16 |
| | | | | 72/348 |
| 4,386,791 | A | * 6/1983 | Watanabe | G01B 7/28 |
| | | | | 280/DIG. 1 |
| 4,817,922 | A | * 4/1989 | Hovance | B60G 17/052 |
| | | | | 280/5.514 |
| 4,854,557 | A | * 8/1989 | Goshima | B60G 11/27 |
| | | | | 267/64.27 |
| 5,011,136 | A | * 4/1991 | Rennex | A63B 25/02 |
| | | | | 482/51 |

(Continued)

*Primary Examiner* — Robert A. Siconolfi
*Assistant Examiner* — James K Hsiao
(74) *Attorney, Agent, or Firm* — Dinsmore & Shohl LLP; Yongsok Choi, Esq.

(57) ABSTRACT

A spring assembly for a vehicle is provided. The spring assembly may include a piston, and a sleeve with a noncircular cross section, the sleeve made from an unreinforced synthetic elastomeric material and being free of reinforcing fibers. The sleeve is coupled with a plurality of end components and defines a deformable pressure vessel, the deformable pressure vessel supplies a support force, and at least one of the end components is the piston.

20 Claims, 8 Drawing Sheets

(56)                    References Cited

U.S. PATENT DOCUMENTS

| 5,129,634  | A  * | 7/1992  | Harris | F16F 9/084 |
| | | | | 267/64.24 |
| 6,085,797  | A  * | 7/2000  | Grabaum | F16D 3/845 |
| | | | | 427/386 |
| 6,173,946  | B1 * | 1/2001  | Wode | B60G 11/27 |
| | | | | 267/64.19 |
| 6,199,837  | B1 * | 3/2001  | Leonard | B60G 11/28 |
| | | | | 267/122 |
| 6,386,523  | B1 * | 5/2002  | Crabtree | F16F 9/057 |
| | | | | 267/122 |
| 6,513,798  | B2 * | 2/2003  | Capek | B60G 11/28 |
| | | | | 267/64.19 |
| 6,685,173  | B2 * | 2/2004  | Oldenettel | B60G 15/08 |
| | | | | 267/122 |
| 6,752,388  | B2 * | 6/2004  | Thurow | F16F 9/05 |
| | | | | 267/64.27 |
| 6,902,155  | B1 * | 6/2005  | Crabtree | F16F 9/057 |
| | | | | 267/64.27 |
| 7,188,827  | B2 * | 3/2007  | Thomae | F16F 9/3292 |
| | | | | 267/122 |
| 7,614,615  | B2 * | 11/2009 | Egolf | F16F 9/0454 |
| | | | | 267/64.19 |
| 8,066,265  | B2 * | 11/2011 | Leonard | F16F 9/04 |
| | | | | 267/190 |
| 8,191,458  | B2 * | 6/2012  | Egolf | F16F 9/057 |
| | | | | 267/64.24 |
| 9,127,737  | B2 * | 9/2015  | Leonard | B60G 11/27 |
| 9,205,718  | B2 * | 12/2015 | Lee | B60G 17/019 |
| 9,587,701  | B2 * | 3/2017  | Brand | F16F 9/06 |
| 10,131,196 | B2 * | 11/2018 | Suissa | B60G 15/12 |
| 2006/0066015 | A1 * | 3/2006 | Tubbs | B60G 7/04 |
| | | | | 267/64.27 |
| 2012/0205844 | A1 * | 8/2012 | Koeske | B60G 11/28 |
| | | | | 428/34.1 |
| 2014/0210170 | A1 * | 7/2014 | Dehlwes | B60G 11/27 |
| | | | | 267/64.27 |
| 2020/0324600 | A1 * | 10/2020 | Johnson | F16F 9/0454 |
| 2021/0332867 | A1 * | 10/2021 | Rose | F16F 9/084 |
| 2022/0410645 | A1 * | 12/2022 | Johnson | F16F 13/002 |
| 2024/0399792 | A1 * | 12/2024 | Yu | B60G 7/001 |

* cited by examiner

SYNTHETIC ELASTOMERIC AIR SPRING WITHOUT REINFORCING FIBERS

CROSS-REFERENCE TO RELATED APPLICATIONS

This application claims the benefit of U.S. Provisional Patent Application No. 63/233,820 filed Aug. 17, 2021 and entitled "Synthetic Elastomeric Air Spring Without Reinforcing Fibers," the contents of which are hereby incorporated by reference in their entirety.

BACKGROUND

Field

The present disclosure relates to spring assemblies. More particularly, the present disclosure relates to spring assemblies including a sleeve.

Technical Background

Air springs are used in a variety of vehicular applications. As one example, air springs can be used to support seats in a vehicle to provide a comfortable ride for an occupant in the seat. In some applications, air springs may be utilized in the vehicle's suspension system. Air springs can assist in providing smooth and constant ride quality, and can be used in performance suspension systems.

For conventional air springs for a vehicle suspension system, the sleeve is made of deformable elastomeric material such as rubber. However, traditional elastomeric materials are unable to support high loads, and conventional air springs generally include reinforcing fibers to contain pressure and support loads placed on the air springs. However, incorporating reinforcing fibers into elastomeric material is time consuming due to a complicated manufacturing process and costly because expensive tools are used, thereby increasing manufacturing costs of conventional air springs.

Moreover, conventional air springs have leak issues in joints and/or connections when run on a thermal cycling test. A crimping process, which is one of the examples of mechanical fastening processes used to manufacture conventional air springs, is the primary leak path and cause of warranty issues. Durability of conventional air springs is limited by the magnitude of the pantographing of the reinforcement. Elimination of the reinforcement increases the range of the uninflated and inflated diameter of the sleeve while maintaining good durability. Furthermore, conventional air springs typically have high hysteresis due to friction caused by the presence of the reinforcing fibers, thereby reducing the performance of the conventional air springs.

BRIEF SUMMARY

In one embodiment, a spring assembly for a vehicle includes a piston, and a sleeve with a noncircular cross section, the sleeve made from an unreinforced synthetic elastomeric material and being free of reinforcing fibers. The sleeve is coupled with a plurality of end components and defines a deformable pressure vessel. The deformable pressure vessel supplies a support force. At least one of the end components is the piston.

In another embodiment, a spring assembly for a vehicle includes a sleeve made from an unreinforced synthetic elastomeric material and being free of reinforcing fibers, and a piston with a noncircular effective area cross section. The sleeve is coupled with a plurality of end components and defines a deformable pressure vessel. The deformable pressure vessel supplies a support force. At least one of the end components is the piston.

In yet another embodiment, a spring assembly for a vehicle includes a restraining cylinder with a noncircular cross section, a sleeve made from an unreinforced synthetic elastomeric material and being free of reinforcing fibers, and a piston. The sleeve is coupled with a plurality of end components and defines a deformable pressure vessel. The deformable pressure vessel supplies a support force. At least one of the end components is the piston.

In yet another embodiment, a spring assembly for a vehicle includes a sleeve, and a piston with non-axisymmetric shape with respect to a centroid path of the piston. The piston allows the sleeve to form a non-axisymmetric rolling lobe profile that has a non-axisymmetric shape. The sleeve is coupled with a plurality of end components to form an airtight chamber filled with compressed air. At least one of the end components is the piston with the non-axisymmetric shape.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to spring assemblies (e.g., air springs). A spring assembly may have a sleeve formed with a material being free of reinforcing fibers, which may allow a larger range of lobe radii and various options for manufacturing process, thereby increasing design freedom. The spring assembly may offer a greater linear spring rate range.

Figure 1:
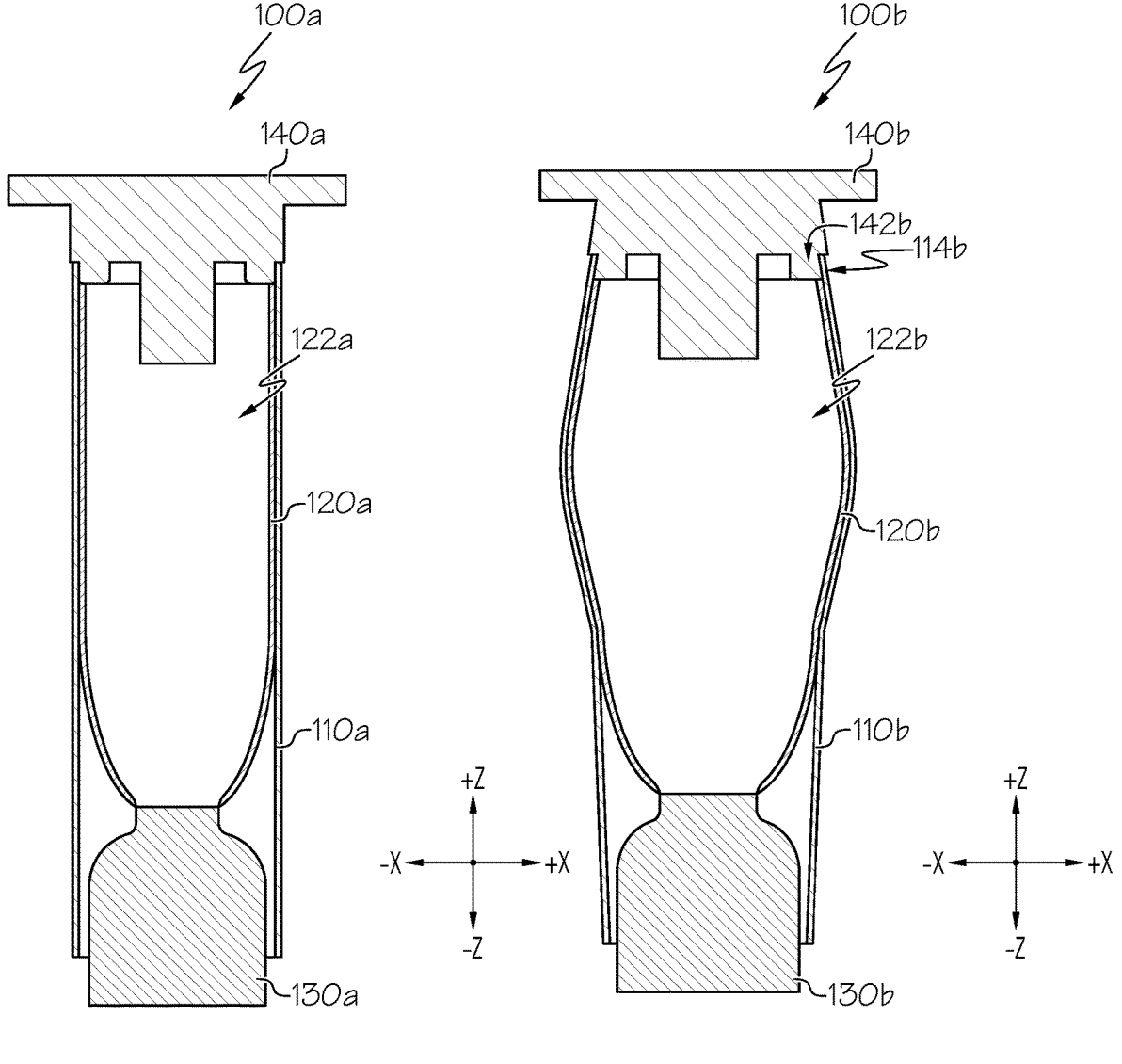
FIG. 1A schematically depicts a cross sectional view of a spring assembly, according to one or more embodiments shown and described herein.
FIG. 1B schematically depicts a cross sectional view of a spring assembly having a varied diameter, according to one or more embodiments shown and described herein.

Referring to FIG. 1A, a cross sectional view of a spring assembly 100a is schematically depicted. The spring assembly 100a may be an air spring assembly including a restraining cylinder 110a, a sleeve 120a, and a piston 130a. In embodiments, the spring assembly 100a may be used for a suspension assembly of any suitable devices or vehicles. For example, any suitable devices or vehicles may include an automobile, a truck, a support device (e.g., a wheelchair or the like), or the like.

In embodiments, the spring assembly 100a may include one or more springs positioned within the restraining cylinder 110a. In some embodiments, the spring assembly 100a further includes a damper including a damper piston. The sleeve 120a may be coupled to an end component 140a at one end portion and to another end component (e.g., the piston 130a) at the other end portion. The sleeve 120a may be coupled to the end component 140a directly or indirectly with one or more intervening end components. The sleeve 120a may be coupled to the piston 130a directly or indirectly with one or more intervening end components. Alternatively, the sleeve 120a may be coupled to a respective end component (e.g., the end component 140a) at each end, or the sleeve 120a may be coupled to a respective piston (e.g., the piston 130a) at each end.

In embodiments, the end component 140a and the sleeve 120a define an interior chamber 122a (e.g., a pressure vessel) which may be a hollow space. The interior chamber 122a may be filled with a fluid, such as a gas including air, other suitable gas, or combination of gases. A load is supported by a support force, which may be developed as a product of fluid pressure (e.g., gas pressure) and an effective area within the spring assembly 100a. The sleeve 120a, in embodiments, is structurally configured do deform within practical tolerances. For example, as the interior chamber 122a is filled up with a gas, the sleeve 120a expands and thereby deforms to be conformed to an inner surface of the restraining cylinder 110a. For example, the sleeve 120a deforms into a shape of the inner surface of the restraining cylinder 110a. The term "practical tolerances" is meant to identify deviations between ideal gas behavior and the behavior of fluids suitable for use in spring assemblies.

Referring to FIG. 1B, a cross sectional view of a spring assembly 100b is schematically depicted. The spring assembly 100b is generally similar to the spring assembly 100a, but the spring assembly 100b has a varied diameter. The spring assembly 100b is an air spring assembly including a restraining cylinder 110b, a sleeve 120b, and a piston 130b. In embodiments, the spring assembly 100b may be used for a suspension assembly of any suitable devices or vehicles. In some embodiments, the spring assembly 100b includes one or more springs positioned within the restraining cylinder 110b. In some embodiments, the spring assembly 100b further includes a damper including a damper piston. The sleeve 120b may be coupled to an end component 140b at one end portion and to the piston 130b at the other end portion. The sleeve 120b may be coupled to the end component 140b directly or indirectly with one or more intervening end components. The sleeve 120b may be coupled to the piston 130b directly or indirectly with one or more intervening end components. Alternatively, the sleeve 120b may be coupled to an end component (e.g., the end component 140b) at each end or the sleeve 120b may be coupled to a piston (e.g., the piston 130b) at each end.

In embodiments, the end component 140b and the sleeve 120b define an interior chamber 122b (e.g., a pressure vessel) which may be a hollow space. The interior chamber 122b may be filled with a fluid, such as a gas including air, other suitable gas, or combination of gases. A load is supported by a support force, which may be developed as a product of fluid pressure (e.g., gas pressure) and an effective area within the spring assembly 100b. The sleeve 120b, in embodiments, is structurally configured do deform within practical tolerances. For example, as the interior chamber 122b is filled up with a gas, the sleeve 120b expands and thereby deforms to be conformed to an inner surface of the restraining cylinder 110b. For example, the sleeve 120b deforms into a shape of the inner surface of the restraining cylinder 110b.

In embodiments, the restraining cylinder 110b has a varied diameter along a longitudinal direction (e.g., +/−Z direction of the depicted coordinate axes of FIG. 1B). For example, the restraining cylinder 110b has an inner diameter that changes along its length (e.g., the Z direction). In some embodiments, the sleeve 120b deforms to conform a shape of the inner surface of the restraining cylinder 110b, and an outer diameter of the sleeve 120b changes along its length (e.g., the 7 direction). Therefore, the inner diameter of the restraining cylinder 110b and the outer diameter of the sleeve 120b are not constant in the Z direction. In some embodiments, the end component 140b may have a shape that conforms the shape of the restraining cylinder 110b to provide better fit between the end component 140b and the restraining cylinder 110b and/or the sleeve 120b. For example, an outer diameter of a coupling portion 142b of the end component 140b gradually increases in the −Z direction. Similarly, an inner diameter of a coupling portion 114b of the restraining cylinder 110b gradually increases in the −Z direction.

In embodiments, the sleeve 120a. 120b may have a noncircular cross section in a direction (e.g., +/−X direction of the depicted coordinate axes of FIGS. 1A and 1B) perpendicular to the longitudinal direction of the sleeve 120a, 120b. For example, the noncircular shape may include oval, convex curve with one axis of symmetry, super ellipse, cassini ovals, cartesian ovals, polygon or the like. The noncircular shape may be symmetrical or asymmetrical.

In embodiments, the restraining cylinder 110a, 110b may have a noncircular cross section in a direction (e.g., +/−X direction of the depicted coordinate axes of FIGS. 1A and 1B) perpendicular to the longitudinal direction of the restraining cylinder 110a. 110b. For example, the noncircular shape may include oval, convex curve with one axis of symmetry, super ellipse, cassini ovals, cartesian ovals, polygon or the like. The noncircular shape may be symmetrical or asymmetrical.

In embodiments, the sleeve 120a, 120b and/or the end component 140a, 140b are free of reinforcing materials, such as fibers. Materials free of reinforcing materials includes materials substantially free of reinforcing materials.

The phrase 'substantially free of' or similar phrases as used herein means that the composition preferably comprises 0% of the stated component, although it will be appreciated that very small concentrations may possibly be present. For example, the sleeve 120*a*, 120*b* and/or the end component 140*a*, 140*b* are may be formed from elastomeric materials, such as thermoplastic elastomer (TPE), thermoplastic polyurethane (TPU), or thermoplastic vulcanisate (TPV), or the like. In embodiments, the sleeve 120*a*, 120*b* and/or the end component 140*a*, 140*b* may be formed through any suitable process, including but not limited to injection molding, blow molding, insert molding, spin molding, extrusion, punchforming, or the like. In embodiments, the sleeve 120*a*, 120*b* and/or the end component 140*a*, 140*b* are treated with molecular alterations such as cross-linking. In embodiments, the sleeve 120*a*, 120*b* and/or the end component 140*a*, 140*b* are treated with mechanical forming process including strain forming, cold working, extrusion-inflation, or thermal-forming.

In embodiments, the sleeve 120*a*, 120*b* may directly attached to the end component 140*a*. 140*b*. For example, the sleeve 120*a*, 120*b* and the end component 140*a*, 140*b* may be molded together. For another example, the sleeve 120*a*. 120*b* and the end component 140*a*, 140*b* may be laser welded together such that the sleeve 120*a*, 120*b* and the end component 140*a*. 140*b* are formed monolithic. By co-manufacturing the sleeve 120*a*. 120*b* and the end component 140*a*. 140*b*, manufacturing complexity may be reduced as compared to conventional air springs that include crimp connections. Moreover, the likelihood of adhesive failure at a junction between the sleeve 120*a*, 120*b* and the end component 140*a*. 140*b* may be reduced. In some embodiments, a connecting portion between the sleeve 120*a*, 120*b* and the end component 140*a*, 140*b* are sealed by mechanical coupling or chemical coupling, for example, a structural adhesive, a crimp connection, an interference fit connection, a bead connection, a bonded connection, a welded connection, layer bonding, or the like. In embodiments, the sleeve 120*a*, 120*b* and the end component 140*a*, 140*b* are engaged with each other by a co-molding approach or a welding approach including laser welding, induction welding, or hot gas welding. The manufacturing approaches of the sleeve 120*a*. 120*b* may potentially reduce total number of components of the spring assembly 100*a*, 100*b*.

In embodiments, the piston 130*a*, 130*b* may be disposed at one end of the spring assembly 100*a*. 100*b* that connects to unsprung mass (e.g., a wheel, an axle, a suspension, or the like). Alternatively, the piston 130*a*. 130*b* may be disposed at the other end of the spring assembly 100*a*. 100*b* that connects to sprung mass (e.g., a frame, structures associated with the frame, a seat, a chassis, or the like).

Figure 2:
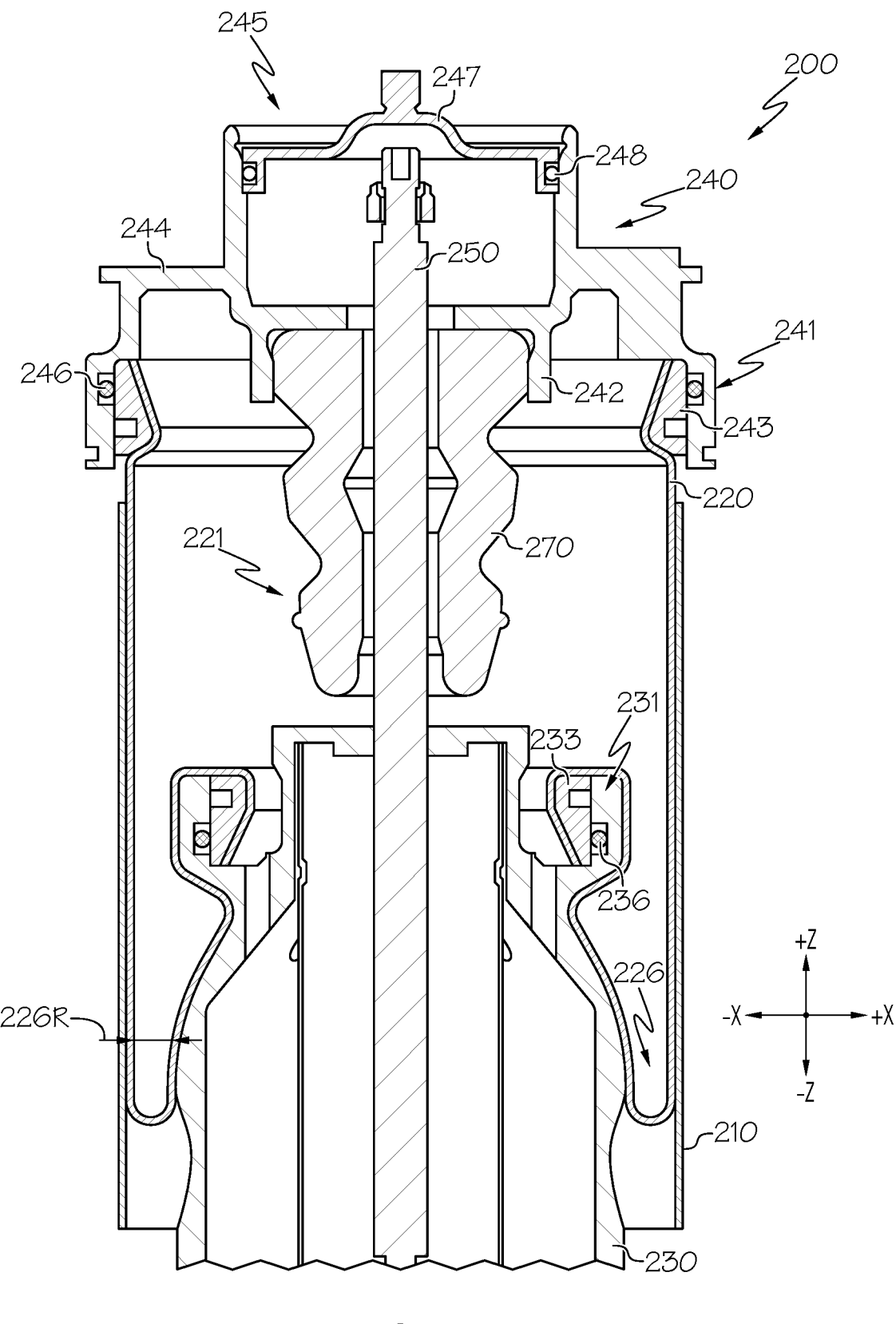
FIG. 2 schematically depicts a cross sectional view of a spring assembly, according to one or more embodiments shown and described herein.

Referring to FIG. 2, a cross sectional view of another embodiment of a spring assembly 200 schematically depicted. In embodiments, the spring assembly 200 includes the restraining cylinder 210, a sleeve 220, a piston 230, an end component 240, and a damper rod 250. The sleeve 220 is disposed inside of the restraining cylinder 210. The restraining cylinder 210 may have a tubular shape such that the sleeve 220 may be disposed therein. The sleeve 220 may conform the inner wall of the restraining cylinder 210. In other words, the restraining cylinder 210 surrounds the sleeve 220 to restrain the shape of the sleeve 220 such that the sleeve 220, which is deformable, may be contained in the restraining cylinder 210. Therefore, an outer periphery of the sleeve 220 may touch the inner wall of the restraining cylinder 210.

In embodiments, the sleeve 220 is attached to the end component 240 at one end (e.g., an attachment portion 243) and to the piston 230 at the other end (e.g., an attachment portion 233). The sleeve 220 may be attached to the end component 240 by laser welding. Similarly, the sleeve 220 may be attached to the piston 230 by laser welding. By attaching the sleeve 220 to the end component 240 and/or the piston 230 by laser welding, the sleeve 220 becomes one piece of component (i.e., a unitary component, monolithic component, or the like) with the end component 240 and/or the piston 230.

In embodiments, the sleeve is attached to the attachment portion 233 of the piston 230 and/or the attachment portion 243 of the end component 240. An O-ring 236 may be disposed between the attachment portion 233 and the end portion 231 of the piston 230 and configured to provide seal between the sleeve 220 and the piston 230. An O-ring 246 may be disposed between the attachment portion 243 and an end portion 241 of the end component 240 and configured to provide seal between the sleeve 220 and the end component 240. In embodiments, the attachment portion 233 and the end portion 231 of the piston 230 may be monolithically formed. In embodiments, the attachment portion 243 and the end portion 241 of the end component may be monolithically formed.

The sleeve 220 and/or the end component 240 may be substantially free of reinforcing fibers and different geometries of a lobe 226 may be realized. For example, the lobe 226 may define a lobe radius 226R. Reinforcing fibers may restrict the geometry of a lobe radius and the lobe radius of a sleeve including reinforcing fibers may be comparatively larger. Since the sleeve 220 is substantially free of reinforcing fibers in some embodiments, the lobe radius 226R may be comparatively smaller than conventional air springs, thereby allowing the geometry of the lobe 226 to be tailored to achieve desired preferential deformation of the sleeve 220 during compression of the spring assembly 200. In embodiments, the lobe radius 226R may be about 3 mm to about 10 mm.

By forming the sleeve 220 substantially free of reinforcing fibers, the spring assembly may reduce noise and/or vibration as compared to air springs with a sleeve including reinforcing fibers. Further, dissimilar deformation between reinforcing fibers and rubber of conventional air springs can lead to noise and vibration. Accordingly, dissimilar deformation between textile reinforcing fibers and rubber of conventional air springs can also lead to shearing actions, which can reduce the durability of conventional air springs and lead to premature failure of conventional air springs. Accordingly, durability of the spring assembly 200 may increase as compared to conventional air springs because the sleeve 220 is substantially free of reinforcing fibers.

Still referring to FIG. 2, the spring assembly 200 may include a jounce bumper 270 disposed on the end component 240. In embodiments, the jounce bumper 270 may be retained by a retaining portion 242 of the end component 240. The retaining portion 242 may be a projection extended from an inner surface of the end component 240, and the jounce bumper 270 may be disposed in an inner space 221 (e.g., a pressure vessel) of the sleeve 220. The jounce bumper 270 may absorb impacts and dampen noise and may prevent the spring assembly 200 from fully compacting during shock impacts, for example in the case a vehicle comprising the spring assembly 200 receives impacts by driving over a pothole, a speed bump, or the like. The jounce bumper 270 may absorb noise and/or vibration.

In embodiments, the end component 240 may include a cap 247 on the top of the end component 240 to seal a top portion 245 of the end component 240. An O-ring 248 may be disposed between the cap 247 and the top portion 245 to provide seal between the cap 247 and the top portion 245. In embodiments, the end component 240 may include an extending portion 244 that extends from the top portion 245 in a lateral direction (e.g., +/−X direction of the depicted coordinate axes in FIG. 2), and extends toward the end portion 241 in a longitudinal direction (e.g., −Z direction of the depicted coordinate axes in FIG. 2).

Figure 3A:
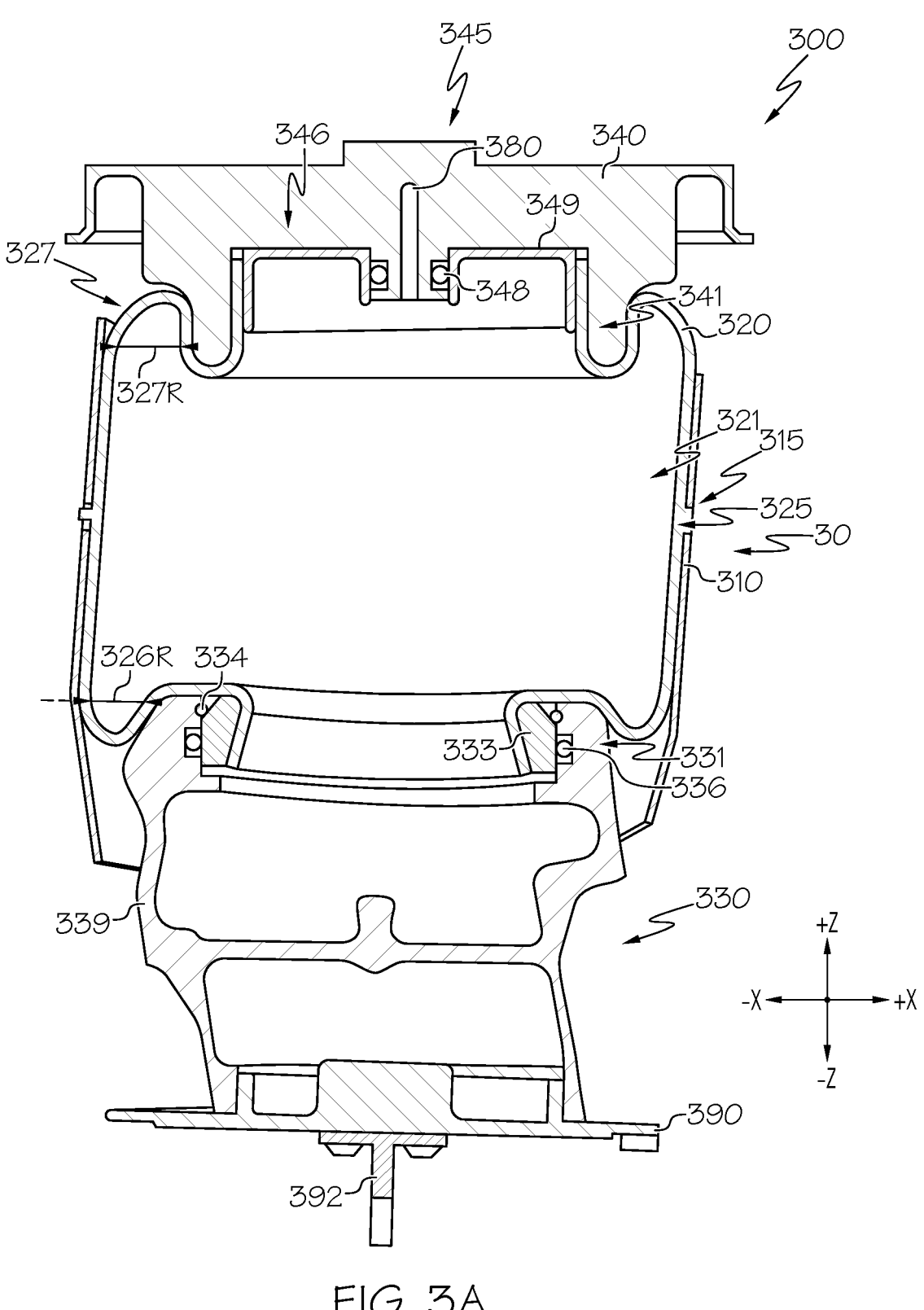
FIG. 3A schematically depicts a cross sectional view of a spring assembly including an asymmetric piston, according to one or more embodiments shown and described herein.

Referring to FIG. 3A, another embodiment of a spring assembly 300 is schematically depicted. In embodiments, the spring assembly 300 includes an end component 340, a sleeve 320, a restraining cylinder 310, a piston 330, and a bottom plate 390. The sleeve 320 is disposed inside of the restraining cylinder 310. The restraining cylinder 310 may have a tubular shape such that the sleeve 320 may be disposed therein. The sleeve 320 may conform the inner wall of the restraining cylinder 310. In other words, the restraining cylinder 310 surrounds the sleeve 320 to restrain the shape of the sleeve 320 such that the sleeve 320, which is deformable, may be contained in the restraining cylinder 310. Therefore, an outer periphery of the sleeve 320 may touch the inner wall of the restraining cylinder 310.

In embodiments, the sleeve 320 couples with the restraining cylinder 310 to form a locking portion 30. The locking portion 30 may include an engaging portion 315 (e.g., a notch, a hole, a groove, a concave portion, or the like) of the restraining cylinder 310 that an engaging portion 325 (e.g., a protrusion, a bead, a convex portion, or the like) of the sleeve 320. The engaging portion 315 may be fit in the engaging portion 325. The locking portion 30 may restrict movement of the sleeve 320 surrounding the locking portion 30 with respect to the restraining cylinder 310. For example, the engaging portion 315 and the engaging portion 325 may restrict a vertical movement (e.g., a movement in +/−Z direction of the depicted coordinate axes in FIG. 3A) of the sleeve 320 near the locking portion 30 with respect to the restraining cylinder 310. In embodiments, the engaging portion 315 and the engaging portion 325 may include a plurality of engaging portions fit to each other respectively. In embodiments, the engaging portion 315 and the engaging portion 325 may restrict a lateral movement (e.g., a movement in +/−X direction of the depicted coordinate axes in FIG. 3A) of the sleeve 320 near the locking portion 30 with respect to the restraining cylinder 310. For example, the lateral movement may include turning or rotation of the sleeve 320 with respect to the restraining cylinder 310.

In embodiments, the sleeve 320 is attached to the end component 340 at one end (e.g., an end portion 341) and to the piston 330 at the other end (e.g., an attachment portion 333). The sleeve 320 may be attached to the end component 340 by laser welding. Similarly, the sleeve 320 may attached to the piston 330 by laser welding. By attaching the sleeve 320 to the end component 340 and/or the piston 330 by laser welding, the sleeve 320 becomes one piece of component (i.e., a unitary component, monolithic component, or the like) with the end component 340 and/or the piston 330.

In embodiments, the sleeve is attached to the attachment portion 333 of the piston 330 and/or the end portion 341 of the end component 340. An O-ring 336 may be disposed between the attachment portion 333 and the end portion 331 of the piston 330 and configured to provide seal between the sleeve 320 and the piston 330. In embodiments, the attachment portion 333 and the end portion 331 of the piston 330 may be monolithically formed. In embodiments, a retaining ring 334, which may be a metal ring, may be disposed between the piston 330 and the attachment portion 333.

In embodiments, the end component 340 may further include a weld cup 349 that fits into an inner step portion 346 of the end component 340. An end portion of the sleeve 320 may be disposed between the end portion 341 of the end component 340 and the weld cup 349 and may provide seal between the end component 340 and the sleeve 320. An O-ring 348 may be disposed between the weld cup 349 and the inner step portion 346 and may provide seal between the weld cup 349 and the inner step portion 346. A gas inlet 380 may be disposed in a middle portion 345 of the end component 340. The gas inlet 380 may be surrounded by the weld cup 349. The gas inlet 380 may be coupled to a gas supplying unit to supply gas in the inner space 321 (e.g., a pressure vessel) of the sleeve 320.

The sleeve 320 and/or the end component 340 may be substantially free of reinforcing fibers and different geometries of a dual lobe including a lobe 326 and a lobe 327 may be realized. For example, the lobe 326 may define a lobe radius 326R and the lobe 327 may define a lobe radius 327R. Reinforcing fibers may restrict the geometry of a lobe radius and the lobe radius of a sleeve including reinforcing fibers may be comparatively larger. Since the sleeve 320 is substantially free of reinforcing fibers in some embodiments, the lobe radius 326R and the lobe radius 327R may be comparatively smaller than conventional air springs, thereby allowing the geometry of the lobe 326 and the lobe 327 to be tailored to achieve desired preferential deformation of the sleeve 320 during compression of the spring assembly 300. In embodiments, the lobe radius 326R may be about 3 mm to about 10 mm and the lobe radius 327R may be about 3 mm to about 10 mm.

By forming the sleeve 320 substantially free of reinforcing fibers, the spring assembly may reduce noise and/or vibration as compared to air springs with a sleeve including reinforcing fibers. Further, dissimilar deformation between reinforcing fibers and rubber of conventional air springs can lead to noise and vibration. Accordingly, dissimilar deformation between textile reinforcing fibers and rubber of conventional air springs can also lead to shearing actions, which can reduce the durability of conventional air springs and lead to premature failure of conventional air springs. Accordingly, durability of the spring assembly 300 may increase as compared to conventional air springs because the sleeve 320 is substantially free of reinforcing fibers.

In embodiments, the sleeve 320 may have a noncircular cross section in a direction (e.g., +/−X direction of the depicted coordinate axes of FIGS. 1A and 1B) perpendicular to the longitudinal direction of the sleeve 320. For example, the noncircular shape may include oval, convex curve with one axis of symmetry, super ellipse, cassini ovals, cartesian ovals, polygon or the like. The noncircular shape may be symmetrical or asymmetrical.

In embodiments, the restraining cylinder 310 may have a noncircular cross section in a direction (e.g., +/−X direction of the depicted coordinate axes of FIGS. 1A and 1B) perpendicular to the longitudinal direction of the restraining cylinder 310. For example, the noncircular shape may include oval, convex curve with one axis of symmetry, super ellipse, cassini ovals, cartesian ovals, polygon or the like. The noncircular shape may be symmetrical or asymmetrical.

In embodiments, the piston 330 may have a noncircular cross section in a direction (e.g., +/−X direction of the depicted coordinate axes of FIGS. 1A and 1B) perpendicular to the longitudinal direction of the restraining cylinder 310. For example, the noncircular shape may include oval, convex curve with one axis of symmetry, super ellipse, cassini ovals, cartesian ovals, polygon or the like. The noncircular shape may be symmetrical or asymmetrical. Asymmetric piston design may allow a better buckling stability and a better control of stiffness curve compared to conventional air springs.

In embodiments, the piston 330 may have a non-axisymmetric shape allowing the sleeve 320 to form a non-axisymmetric rolling lobe profile that has a non-axisymmetric shape. In embodiments, an outer wall 339 of the piston 330 has a varying thickness along a longitudinal direction of the piston 330. In embodiments, an outer wall 339 of the piston 330 has a varying thickness along a circumference of the piston 330. Various piston shapes may provide control over the stiffness curve of the spring assembly 300.

In embodiments, the piston 330 with the non-axisymmetric shape allows the sleeve 320 to form a non-axisymmetric rolling lobe profile that has a non-axisymmetric shape. For example, the lobe 326 and the lobe 327 may have different shapes and/or sizes around the circumference of the sleeve 320.

In embodiments, an O-ring 336 may be disposed between the attachment portion 333 of the piston 330 and the end portion 331 of the piston. The O-ring 336 may provide seal between the attachment portion 333 and the end portion 331.

Figure 3B:
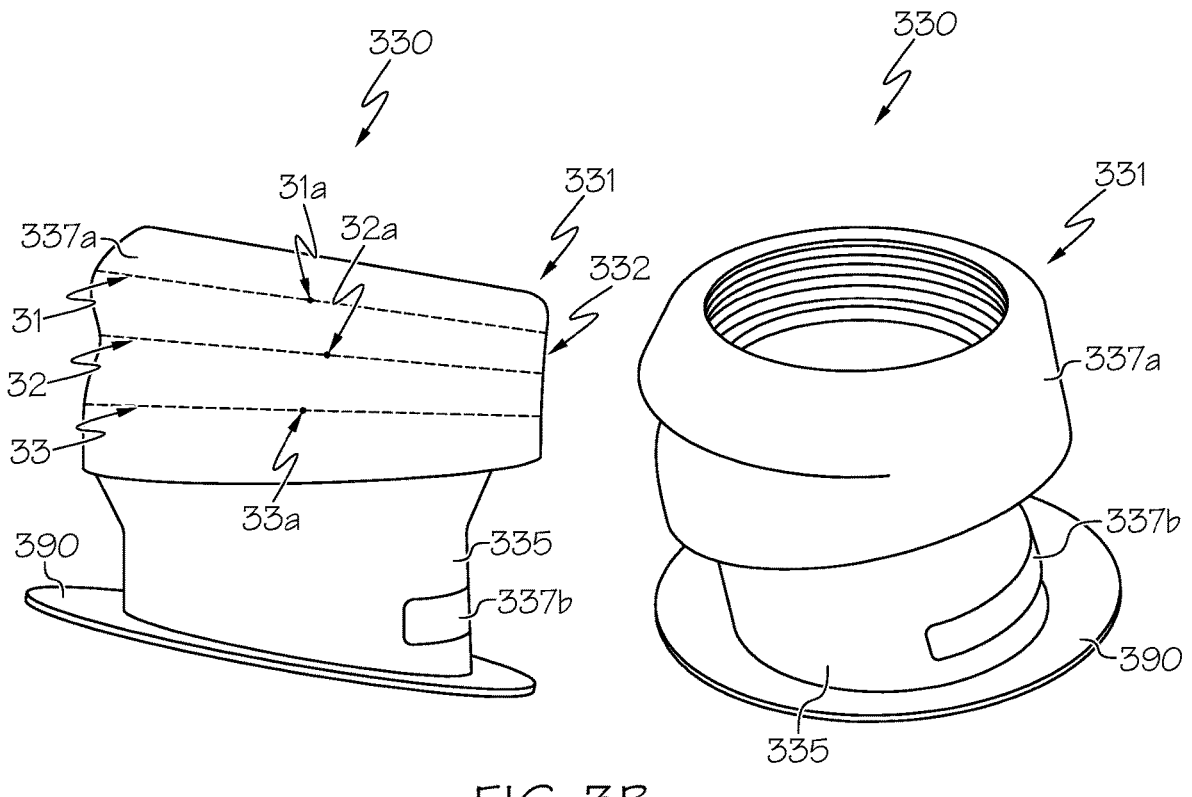
FIG. 3B schematically depicts perspective views of the asymmetric piston of the spring assembly of FIG. 3A, according to one or more embodiments shown and described herein.

Referring to FIG. 3B, perspective views of the piston 330 engaged with the bottom plate 390 in two different angles are depicted. In embodiments, the piston 330 have machined surfaces 337*a*. 337*b* and a casting surface 335. The surface 337*a* may be a profile of the piston 330, and the surface 335 may be a base of the piston 330.

An effective area of an air spring is the area calculated from the following equation:

$$\text{Effective Area} = A_e = \text{Force/Pressure}$$

In a piston cylinder air spring, the effective area is the cross-sectional area of the piston. However, in a rolling lobe air spring, the lobe adds additional area of air being displaced beyond the piston, but the lobe moves approximately half the distance of the piston due to the rolling behavior. Because of this difference in travel, the effective area is not simply the piston area plus the lobe area. The industry has found through testing that the effective area of a rolling lobe air spring average of the areas of the piston and multiplied by a scale factor of 0.9 as shown in the following equation:

$$\text{Effective Area} = A_e = \frac{\pi}{4} * \left(\frac{D_P + D_{max}}{2}\right)^2 * 0.9$$

Where $D_P$ is the piston diameter and $D_{max}$ is the max diameter of the sleeve either constrained by a restraining cylinder or limited by the locking angle of reinforcing fibers in the bellows/sleeve.

The effective area is calculated at the cross section of the piston where the sleeve is tangent with the piston, which is defined herein as an effective area cross section of the piston.

As the air spring is compressed, the tangent point of the sleeve to the piston moves on the piston (e.g., cross sections in dashed lines 31, 32, 33 in FIG. 3B). This results in there being an infinite number of effective area cross sections of the piston that can be defined between the rebound and jounce positions of the spring. Along the travel of the piston, the centroids (e.g., centroids 31*a*, 32*a*, 33*a* in FIG. 3B) of the cross sections of the piston define an imaginary path, which is defined herein as a centroid path of the piston.

Note that a traditional air spring design with a straight line or arc centerline axis has circular cross sections perpendicular to the centerline axis. In some embodiments, the cross sections of the piston are not always perpendicular to the centroid path. The non-axisymmetric surface profile of the piston can be formed by translating each effective area cross section of the piston in the same plane as needed. As a result, some portion of the effective area cross section of the piston is not perpendicular to the centroid path.

Still referring to FIG. 3B, in embodiments, the effective area cross sections 31, 32, 33 of the piston 330 are aligned to an edge 332 and allow a rolling lobe diameter unchanged on one side (e.g., the edge 332 side). Because of this alignment, the effective area cross sections 31, 32, 33 with different sizes translate in a plane, which results in an engineered surface of the piston 330 meeting the variable effective area requirements in the design. In embodiments, the effective area cross sections 31, 32, 33 may have a non-circular shape and/or a circular shape. It is noted that such alignment in FIG. 3B is only a demonstration. In other words, the alignment to edge 332 in FIG. 3B may not be necessary and may depend on the needs of the design. The edge 332 may be straight in a longitudinal direction of the piston 330. The edge 332 may be curved and the curvature of the edge 332 may follow any desired curved path. In embodiments, the centroid path of the piston 330 may be curvilinear. The centroid path may not be constrained to a single plane.

Figure 4:
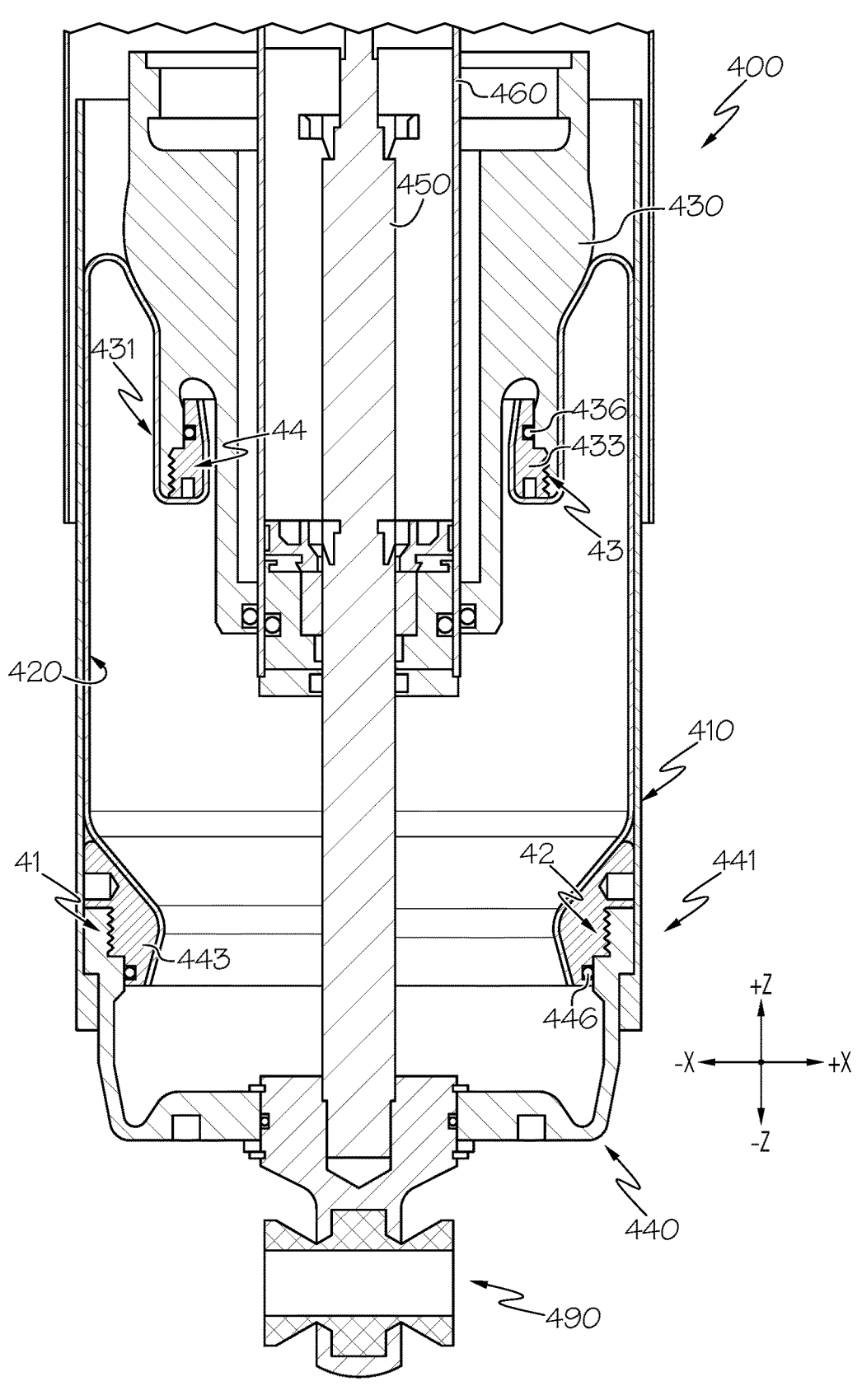
FIG. 4 schematically depicts a cross sectional view of a spring assembly with a threaded connection, according to one or more embodiments shown and described herein.

Referring to FIG. 4, another embodiment of a spring assembly 400 is depicted. The spring assembly 400 may include a retaining cylinder 410, a sleeve 420, a piston 430, an end component 440, a damper rod 450, and a damper tube 460.

In embodiments, the sleeve 420 may be attached to an attachment portion 433 that engages with an end portion 431 of the piston 430. One end of the sleeve 420 may be attached to the attachment portion 433 by laser welding. The attachment portion 433 has a thread 44 that engages with a thread 43 of the end portion 431. An O-ring 436 may be disposed between the attachment portion 433 and the end portion 431 and may provide seal between the attachment portion 433 and the end portion 431.

In embodiments, the sleeve 420 may be attached to an attachment portion 443 that engages with an end portion 441 of the end component 440. One end of the sleeve 420 may be attached to the attachment portion 443 by laser welding. The attachment portion 443 has a thread 42 that engages with a thread 41 of the end portion 441. An O-ring 446 may be disposed between the attachment portion 443 and the end portion 441 and may provide seal between the attachment portion 443 and the end portion 441. In embodiments, the end component 440 engages with a ball joint 490.

Figure 5:
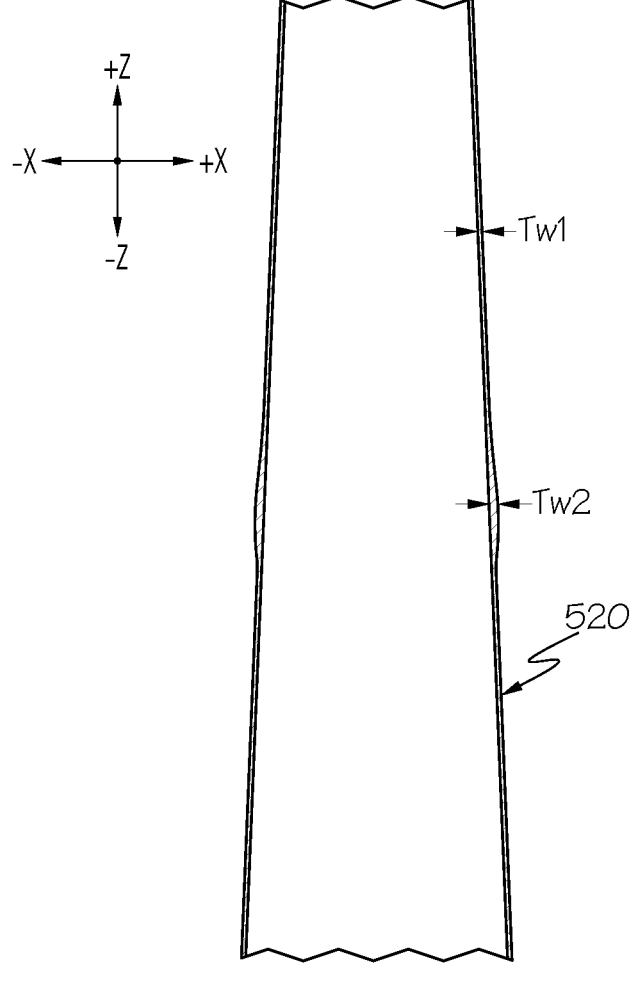
FIG. 5 schematically depicts a cross sectional view of a sleeve with a variable thickness, according to one or more embodiments shown and described herein.

Referring to FIG. 5, another embodiment of a sleeve 520 is depicted. A wall thickness Tw (e.g., a first wall thickness $Tw_1$ and a second wall thickness $Tw_2$) of the sleeve 520 may vary along in a longitudinal direction of the sleeve 520 (e.g., +/−Z direction of the depicted coordinate axes of FIG. 5). For example, the sleeve 520 has the first wall thickness $Tw_1$ at a first location, and the second wall thickness $Tw_2$ at a second location that vertically spaced apart from the first location, where the first wall thickness $Tw_1$ is different from the second wall thickness $Tw_2$. In embodiments, the first wall thickness $Tw_1$ is less than the second wall thickness $Tw_2$. Variation of the wall thickness Tw of the sleeve 520 may assist in preferential deformation of the sleeve 520 when a spring assembly having the sleeve 520 with a varying thickness is compressed. In embodiments, the sleeve

520 may be molded to achieve a defined varying thickness when the sleeve 520 is not inflated. In other words, the defined varying thickness of the sleeve 520 may be obtained during the manufacturing stage (e.g., during the molding process). When inflated, the sleeve 520 having the varying thickness may have a required strength where needed, and may efficiently allow a weaker section where an additional strength is not needed. In embodiments, the sleeve 520 may have a varying thickness along a circumference of the sleeve 520.

Figure 6:
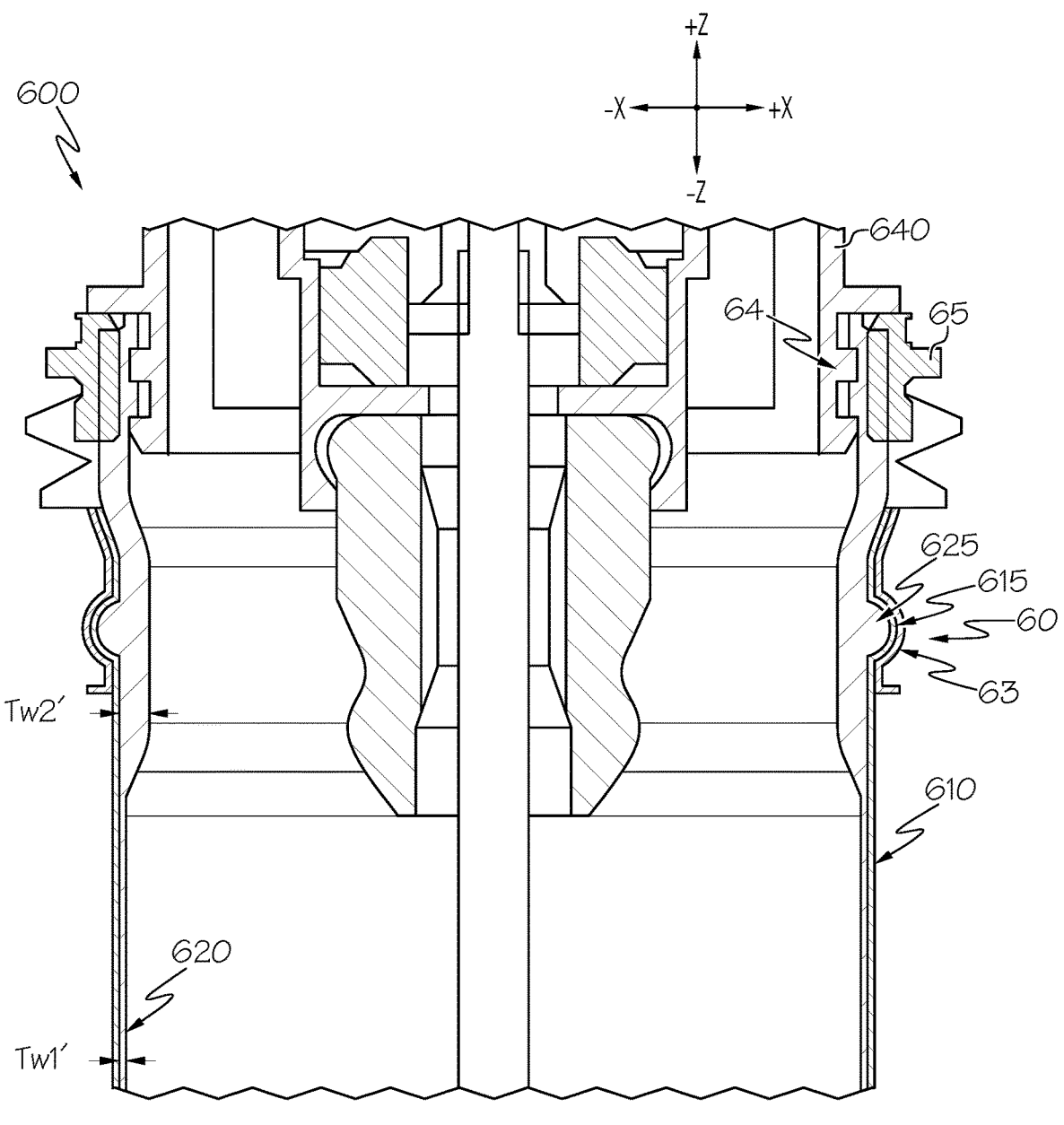
FIG. 6 schematically depicts a cross sectional view of a spring assembly with a mechanical sleeve attachment, according to one or more embodiments shown and described herein.

FIG. 6 is another embodiment of a varying thickness of a sleeve 620. A wall thickness Tw (e.g., a first wall thickness $Tw_1'$ and a second wall thickness $Tw_2'$) of a sleeve 620 may vary along the sleeve 620 in a longitudinal direction of the sleeve 620 (e.g., +/−7 direction of the depicted coordinate axes of FIG. 6). For example, the sleeve 620 has the first wall thickness $Tw_1'$ at a first location, and the second wall thickness $Tw_2'$ at a second location that vertically spaced apart from the first location, where the first wall thickness $Tw_1'$ is different from the second wall thickness $Tw_2'$. In embodiments, the first wall thickness $Tw_1'$ is less than the second wall thickness $Tw_2'$. In embodiments, the second location with the second wall thickness $Tw_2'$, which is thicker than the first wall thickness $Tw_1'$, is located adjacent to the end portion of the sleeve 620. In embodiments, the sleeve 620 may have a varying thickness along a circumference of the sleeve 620.

FIG. 6 also provides some embodiments of a mechanical attachment. In embodiments, the sleeve 620 may be mechanically attached to an end component 640. For example, the end component 640 has one or more protruding portions 64 to retain an end portion of the sleeve 620. The end portion of the sleeve 620 may be disposed between the protruding portion 64 and an interference ring 65. The interference ring 65 may press the end portion of the sleeve 620 against the protruding portion 64 to mechanically attach the end portion of the sleeve 620 to the end component 640.

In embodiments, the sleeve 620 couples with the restraining cylinder 610 to form a locking portion 60. The locking portion 60 may include an engaging portion 615 (e.g., a notch, a hole, a groove, a concave portion, or the like) of the restraining cylinder 610 that an engaging portion 625 (e.g., a protrusion, a bead, a convex portion, or the like) of the sleeve 620. The engaging portion 615 may be fit in the engaging portion 625. The locking portion 60 may restrict movement of the sleeve 620 surrounding the locking portion 60 with respect to the restraining cylinder 610. For example, the engaging portion 615 and the engaging portion 625 may restrict a vertical movement (e.g., a movement in +/−Z direction of the depicted coordinate axes in FIG. 6) of the sleeve 620 near the locking portion 60 with respect to the restraining cylinder 610. In embodiments, the engaging portion 615 and the engaging portion 625 may include a plurality of engaging portions fit to each other respectively. In embodiments, the engaging portion 615 and the engaging portion 625 may restrict a lateral movement (e.g., a movement in +/−X direction of the depicted coordinate axes in FIG. 6) of the sleeve 620 near the locking portion 60 with respect to the restraining cylinder 610. For example, the lateral movement may include turning or rotation of the sleeve 620 with respect to the restraining cylinder 610.

In embodiments, the locking portion 60 may be supported by a retaining ring 63. Generally, the retaining ring 63 may not provide a clamping or locking force prior to inflation of the sleeve 620. On the other hand, the retaining ring 63 may provide pressing force to the locking portion 60 to retain the engaging portion 615 and the engaging portion 625 in place when the sleeve 620 is inflated by restricting the growth of the sleeve 620.

Figure 7:
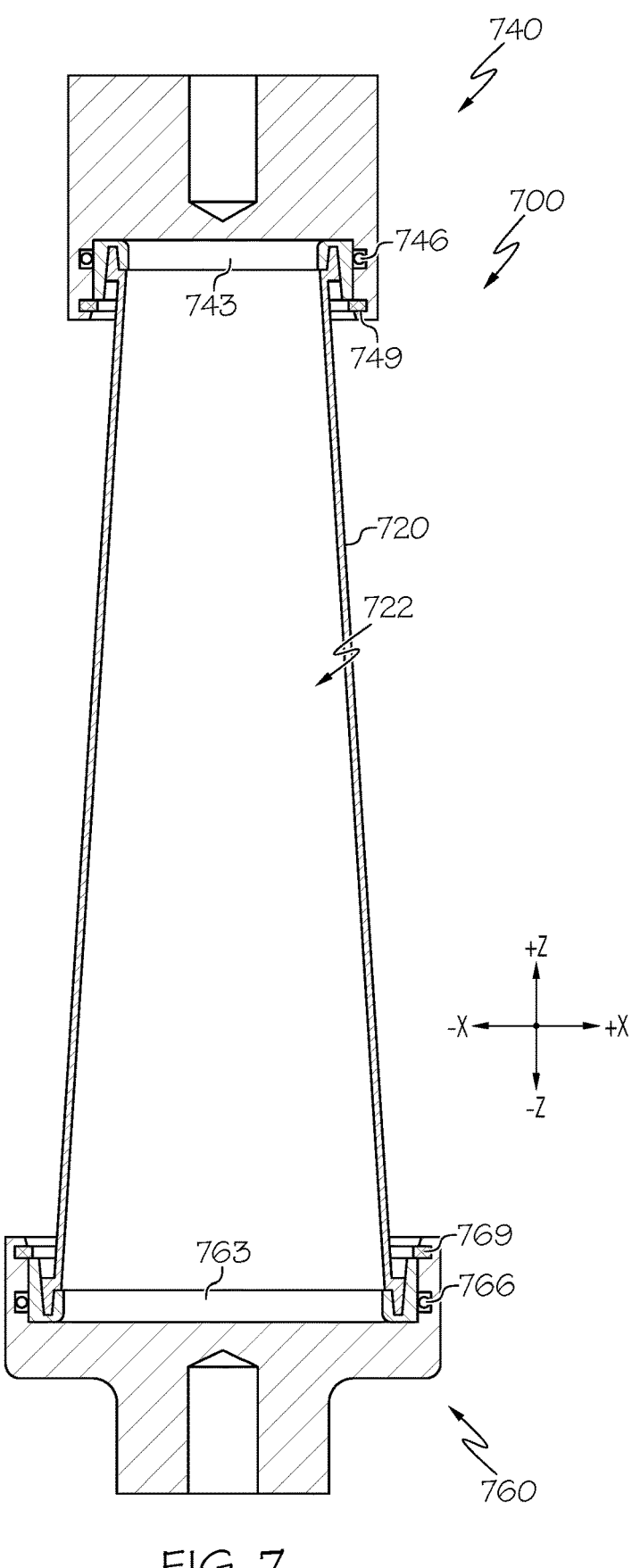
FIG. 7 schematically depicts a cross sectional view of a spring assembly with an induction welding sleeve attachment, according to one or more embodiments shown and described herein.

Referring to FIG. 7, a cross sectional view of another embodiment of a spring assembly 700 is schematically depicted. The spring assembly 700 may include a sleeve 720, a first end component 740, and a second end component 760.

In embodiments, the sleeve 720 may be coupled to the first end component 740 and the second end component 760 directly or indirectly with one or more intervening end components. The sleeve 720 may be attached to a weld ring 743 of the first end component 740 at one end and the sleeve 720 may be attached to a weld ring 763 of the second end component 760 at the other end. An O-ring 746 may be disposed between the weld ring 743 and the first end component 740, and may provide seal between the weld ring 743 and the first end component 740. A retaining ring 749, which may be made from a metallic material, may retain the weld ring 743 in place. An O-ring 766 may be disposed between the weld ring 763 and the second end component 760, and may provide seal between the weld ring 763 and the second end component 760. A retaining ring 769, which may be made from a metallic material, may retain the weld ring 763 in place.

In embodiments, the sleeve 720 may be induction welded to the weld ring 743 of the first end component 740 at one end and the sleeve 720 may be induction welded to the weld ring 763 of the second end component 760 at the other end.

In embodiments, the first end component 740, the second end component 760, and the sleeve 720 may define an interior chamber 722 (e.g., a pressure vessel) which may be a hollow space. The interior chamber 722 may be filled with a fluid, such as a gas including air, other suitable gas, or combination of gases. The sleeve 720, in embodiments, is structurally configured do deform within practical tolerances. For example, as the interior chamber 722 is filled up with a gas, the sleeve 720 expands and thereby defines a shape. The term "practical tolerances" is meant to identify deviations between ideal gas behavior and the behavior of fluids suitable for use in spring assemblies. In embodiments, spring assembly 700 may not include a restraining cylinder.

Accordingly, it should now be understood that embodiments of the present disclosure are directed to spring assemblies that may provide an innovative low cost, high performance air spring design with unique material and innovative manufacturing process.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

It should be understood that embodiments, alternative embodiments, and/or materials used in the construction of embodiments or alternative embodiments, are applicable to all other embodiments described herein.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A spring assembly for a vehicle comprising:
a piston extending in a longitudinal direction of the piston and having a non-axisymmetric surface along the longitudinal direction such that a centroid path of the piston is curved; and
a sleeve made from an unreinforced synthetic elastomeric material and being free of reinforcing fibers,
wherein the sleeve is coupled with a plurality of end components and defines a deformable pressure vessel, the deformable pressure vessel supplies a support force, and at least one of the end components is the piston,
wherein, when the spring assembly is in a rebound position, a tangent point of contact between the piston and the sleeve defines a first cross section,
wherein when the spring assembly is in a jounce position, the tangent point of contact between the piston and the sleeve defines a second cross section, and
wherein, between the first and second cross sections, the piston is non-axisymmetric.

2. The spring assembly according to claim 1, wherein the unreinforced synthetic elastomeric material includes thermoplastic elastomer (TPE), thermoplastic polyurethane (TPU), or thermoplastic vulcanisate (TPV).

3. The spring assembly according to claim 1, wherein the sleeve is formed by a method including injection molding, blow molding, punch-forming, or extruding of the unreinforced synthetic elastomeric material.

4. The spring assembly according to claim 1, wherein a lobe radius of the sleeve is about 3 mm to about 10 mm.

5. The spring assembly according to claim 1, wherein the piston is disposed either at one end of the spring assembly that connects to unsprung mass or at the other end of the spring assembly that connects to sprung mass.

6. The spring assembly according to claim 1, wherein the sleeve and the end components are engaged with co-molding or welding including laser welding, induction welding, or hot gas welding.

7. The spring assembly according to claim 1, wherein the sleeve is treated with molecular alterations.

8. The spring assembly according to claim 1, wherein the sleeve is treated with mechanical forming process including strain forming, cold working, extrusion-inflation, or thermal-forming.

9. The spring assembly according to claim 1, wherein the piston includes at least two pistons each disposed on one end of the spring assembly and on the other end of the spring assembly to form a dual lobe.

10. The spring assembly according to claim 1, further comprising:
a restraining cylinder,
wherein the sleeve couples with the restraining cylinder to form a locking portion of the sleeve.

11. The spring assembly according to claim 1, wherein the non-axisymmetric surface is a surface of an outer wall of the piston.

12. The spring assembly according to claim 1, wherein the piston has a noncircular cross section.

13. The spring assembly according to claim 1, wherein the sleeve has a varying thickness along a length of the sleeve.

14. The spring assembly according to claim 1, further comprising:
a restraining cylinder with a noncircular cross section in a direction perpendicular to a longitudinal direction of the restraining cylinder.

15. A spring assembly for a vehicle comprising:
a sleeve; and
a piston having a non-axisymmetric shape allowing the sleeve to form a non-axisymmetric rolling lobe profile that has a non-axisymmetric shape,
wherein the sleeve is coupled with a plurality of end components to form an airtight chamber filled with compressed air, and at least one of the end components is the piston with the non-axisymmetric shape,
wherein, when the spring assembly is in a rebound position, a tangent point of contact between the piston and the sleeve defines a first cross section,
wherein when the spring assembly is in a jounce position, the tangent point of contact between the piston and the sleeve defines a second cross section, and
wherein, between the first and second cross sections, the piston is non-axisymmetric.

16. The spring assembly according to claim 15,
wherein an effective area of the spring assembly is variable through at least a portion of travel of the spring assembly,
wherein an effective area cross section of the piston is in-plane translated such that a centroid of the effective area cross section stays in a plane of the effective area cross section, and wherein a centroid path connecting the centroid of the effective area cross section is not perpendicular to an effective area cross section of the piston through at least the portion of the travel.

17. The spring assembly of claim 16, wherein the effective area cross section is circular at least in some cross sections of the piston.

18. The spring assembly of claim 16, wherein the effective area cross section is non-circular at least in some cross sections of the piston.

19. The spring assembly according to claim 16, wherein the centroid path is curvilinear.

20. The spring assembly according to claim 16, wherein the centroid path of the piston is not constrained to a single plane.

* * * * *